(12) United States Patent
Agashe et al.

(10) Patent No.: US 9,031,883 B2
(45) Date of Patent: May 12, 2015

(54) SYSTEMS AND METHODS FOR EVENT TRACKING USING TIME-WINDOWED COUNTERS

(71) Applicant: Facebook, Inc., Menlo Park, CA (US)

(72) Inventors: Bhalchandra Suresh Agashe, Sunnyvale, CA (US); Gil Shklarski, New York, NY (US); Christopher Alexander Stein, Los Angeles, CA (US); Nickolay Vladimirov Tchervenski, Bothell, WA (US)

(73) Assignee: Facebook, Inc., Menlo Park, CA (US)

( * ) Notice: Subject to any disclaimer, the term of this patent is extended or adjusted under 35 U.S.C. 154(b) by 27 days.

(21) Appl. No.: 13/631,523

(22) Filed: Sep. 28, 2012

(65) Prior Publication Data

US 2014/0095412 A1 Apr. 3, 2014

(51) Int. Cl.
*G06F 15/18* (2006.01)
*G06N 5/02* (2006.01)
*G06N 99/00* (2010.01)
*G06Q 50/00* (2012.01)

(52) U.S. Cl.
CPC ............... *G06N 5/02* (2013.01); *G06N 99/005* (2013.01); *G06Q 50/01* (2013.01)

(58) Field of Classification Search
None
See application file for complete search history.

(56) References Cited

U.S. PATENT DOCUMENTS

2012/0041711 A1* 2/2012 Jacoby et al. ............... 702/151

OTHER PUBLICATIONS

Akoglu et al. "Event Detection in Time Series of Mobile Communication Graphs", Army Science Conference, 2010, pp. 8.*

* cited by examiner

*Primary Examiner* — Li-Wu Chang
(74) *Attorney, Agent, or Firm* — Perkins Coie LLP

(57) ABSTRACT

To allow for tracking events and classifying assets within a social networking system. A time series of occurrences of an event type associated with at least one asset is generated. A first signal value and a second signal value is determined based on the time series. The at least one asset is classified based on comparison of the first signal value and the second signal value. In an embodiment, the time series is based on at least one time window including time intervals. In an embodiment, counters to determine a number of occurrences of an event type are associated with the time intervals. In an embodiment, each of the counters are incremented upon occurrence of the event type associated with the at least one asset during an associated time interval.

18 Claims, 7 Drawing Sheets

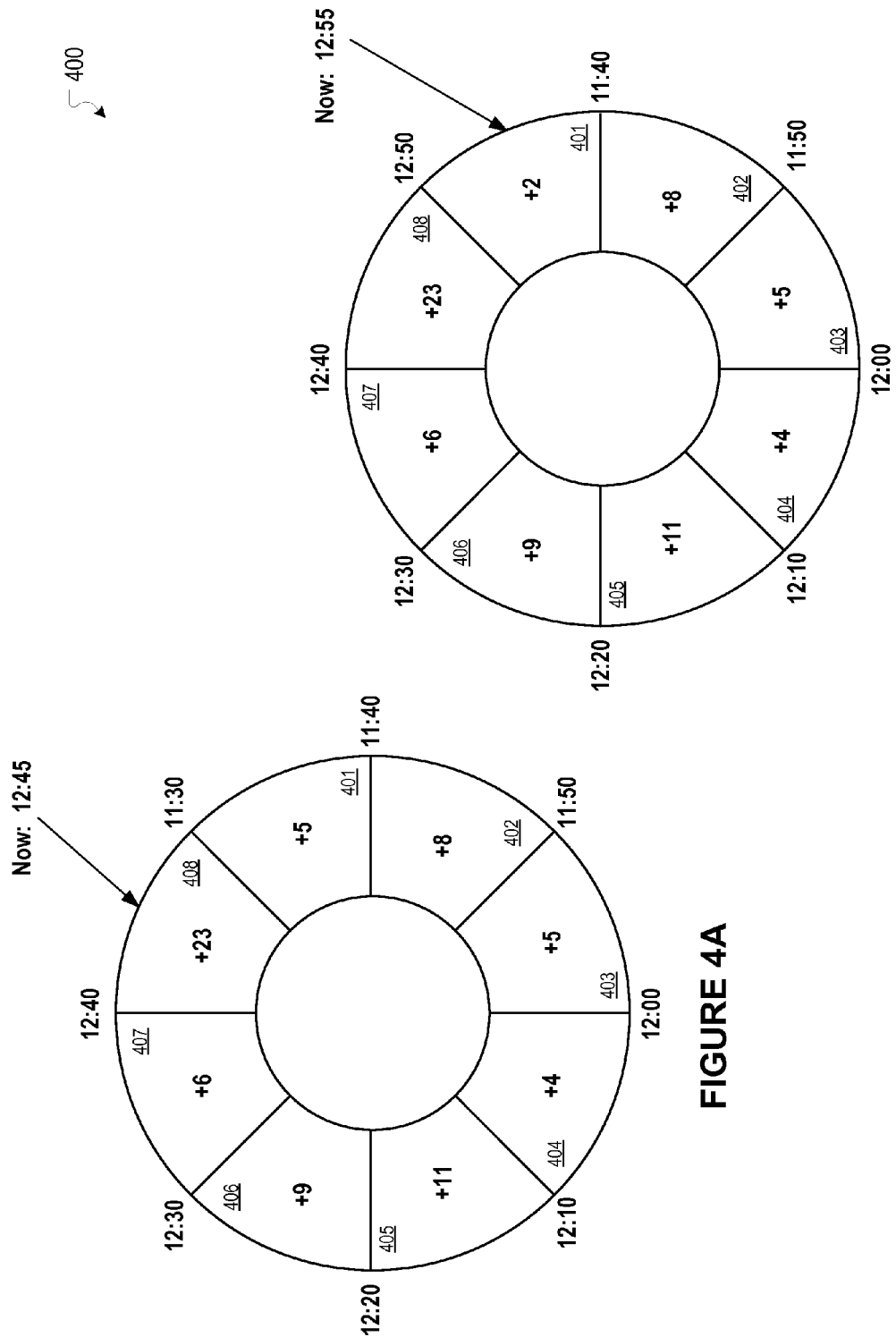

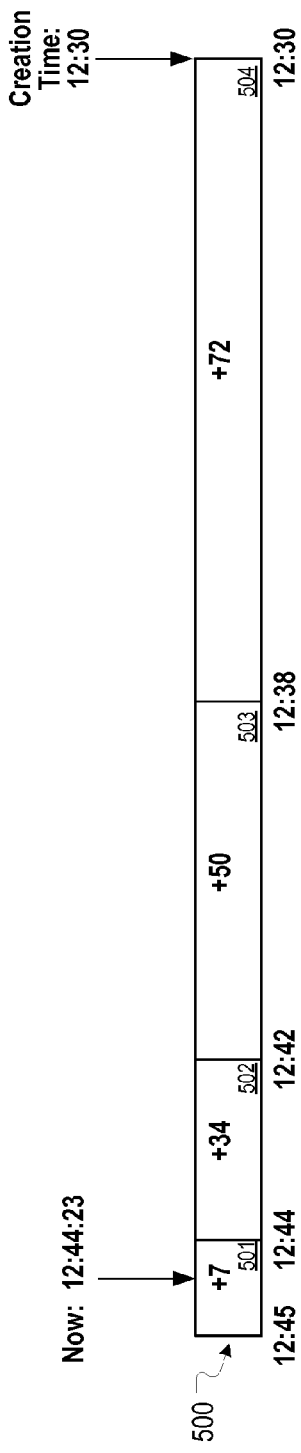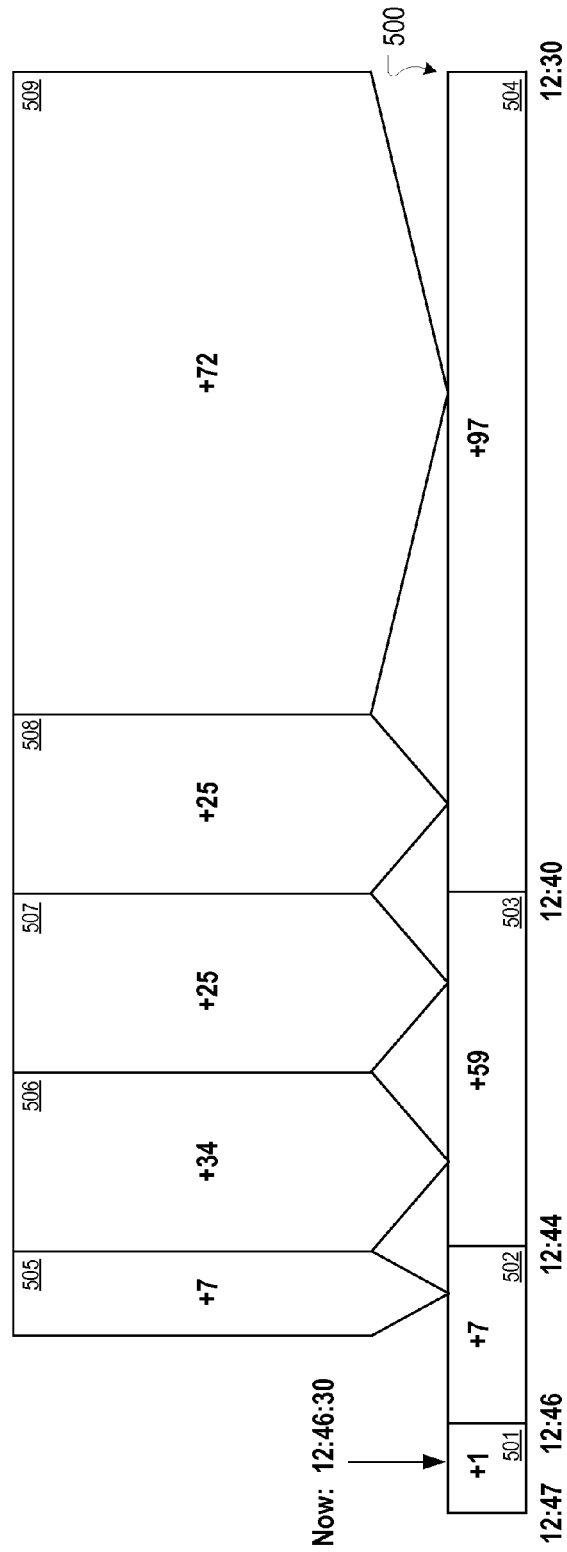

SYSTEMS AND METHODS FOR EVENT TRACKING USING TIME-WINDOWED COUNTERS

FIELD OF THE INVENTION

The present invention relates to the field of social networking. More particularly, the present invention provides techniques for tracking events and classifying assets within a social networking system.

BACKGROUND

Internet social networks have become a significant phenomenon. Social networks allow an Internet user to create an account and a user profile, often for free, and interact with other users of the social network. A social network user can gain access to the profile of another user by requesting to add him or her as a friend. Once approved, the "friendship" typically gives both users access to each other's profiles and the content posted on them. Friends' posts may appear as news stories in each other's news feeds, and friends can usually comment on each other's news stories. Social network users typically seek to assemble a group of friends or followers with whom they interact. Information on a user's profile is often only accessible to the user's friends.

Social networks are providing users with increasingly sophisticated functionality. Early social networks offered little more than a simple interface for users to communicate and post messages. Now, on many social networks, users may share numerous different types of content and interact with each other's content in a variety of ways. A user interaction may result in an event, i.e., an action that occurs within the social network. As social networks grow in size and complexity, the volume and variety of events that occur within the social networks may increase exponentially. An operator of a social network may wish to update the features, functionality, and user interface of the social network based on the types and frequency of user interactions and other events. Moreover, an operator of a social network may wish to assess users, content items, messages, and other assets based on the events involving them.

SUMMARY

To allow for tracking events and classifying assets within a social networking system, embodiments of the invention include systems, methods, and computer readable media for event tracking using time-windowed counters. At least one time series of occurrences of an event type associated with at least one asset is generated. A first signal value and a second signal value is determined based on the time series. The at least one asset is classified based on comparison of the first signal value and the second signal value.

In an embodiment, at least one of the first signal value and the second signal value is based on uniqueness. In an embodiment, the time series is based on at least one time window including time intervals. In an embodiment, counters to determine a number of occurrences of an event type are associated with the time intervals. In an embodiment, each of the counters are incremented upon occurrence of the event type associated with the at least one asset during an associated time interval.

In an embodiment, the at least one time window is implemented as a circular buffer. The circular buffer may comprise elements representing the time intervals. In an embodiment, a counter associated with a least recent time interval of the time intervals is reset, and the counter is incremented upon occurrence of the event type associated with the at least one asset during a most recent time interval.

In an embodiment, the at least one time window is implemented as a linear buffer. The linear buffer may be associated with at least one of exponentially-decaying time intervals and non-decreasing time intervals. In an embodiment, the linear buffer may comprise elements representing the time intervals. In an embodiment, a value is provided from a first counter associated with a first time interval to a second counter associated with a second time interval, the first counter is reset, and the first counter is incremented upon occurrence of the event type associated with the at least one asset.

In an embodiment, a score is generated based on a procedure incorporating the first signal value and the second signal value and the at least one asset is assigned to a classification based on the score. In an embodiment, the procedure comprises at least one of a decision tree and a machine learning model. In an embodiment, the classification comprises at least one of a spam category, a popularity category, and a ranking.

In an embodiment, the determining comprises calculating an integral of at least one function. In an embodiment, a policy is modified based on classification of the at least one asset. In an embodiment, at least one of the generating, the determining, and the classifying is performed in real time.

Many other features and embodiments of the invention will be apparent from the accompanying drawings and from the following detailed description.

BRIEF DESCRIPTION OF THE DRAWINGS

FIG. 4A illustrates an example circular buffer representing a first time window and a series of counters in accordance with an embodiment of the invention.

FIG. 4B illustrates an example circular buffer representing a second time window and a series of counters in accordance with an embodiment of the invention.

FIG. 5A illustrates an example linear buffer representing a third time window comprising exponentially-decaying time intervals and a series of associated counters in accordance with an embodiment of the invention.

FIG. 5B illustrates an example linear buffer representing a fourth time window comprising exponentially-decaying time intervals and a series of associated counters in accordance with an embodiment of the invention.

Figure 1:
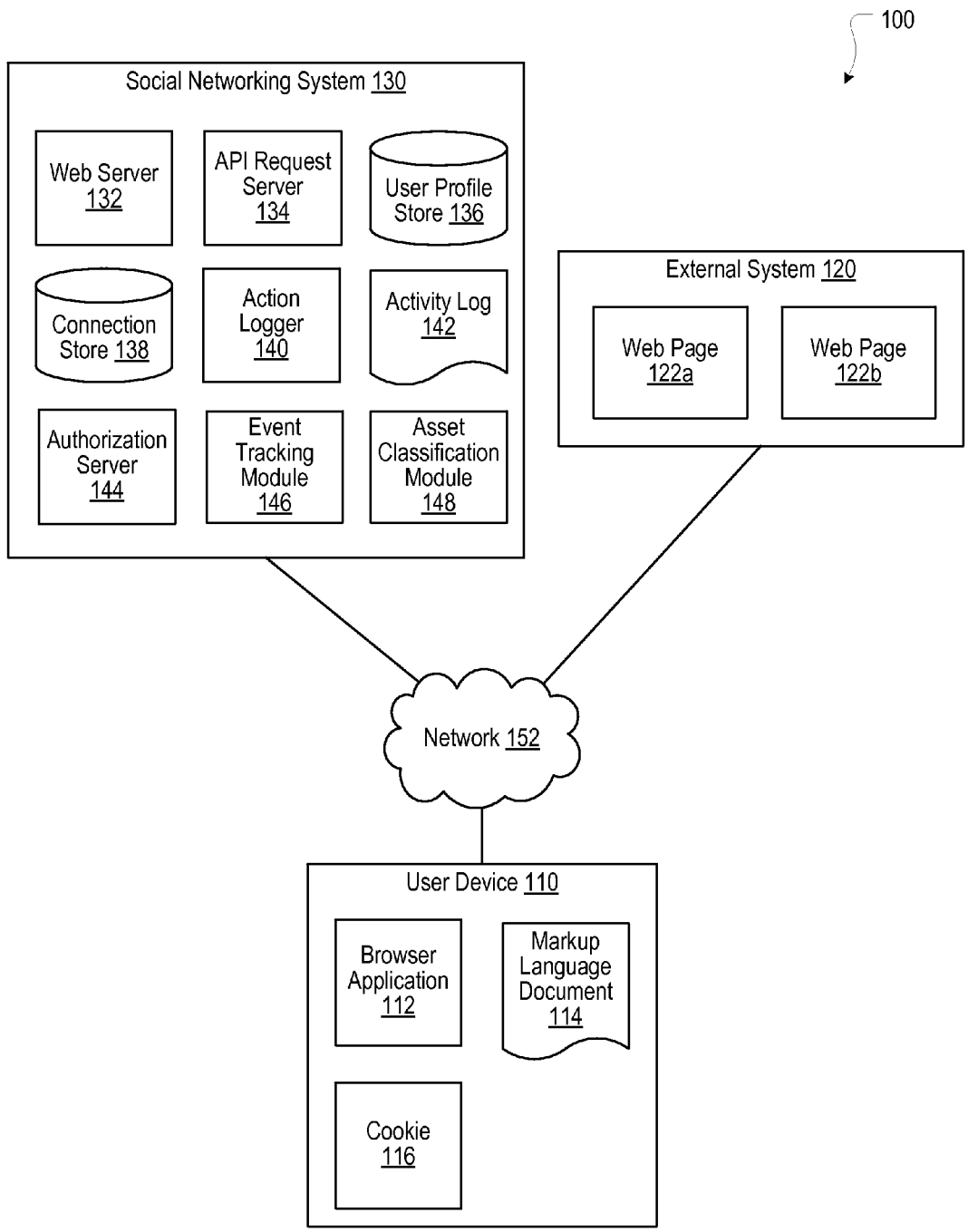
FIG. 1 is a network diagram of a system 100 for tracking events and classifying assets within a social network in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

FIG. 1 is a network diagram of a system 100 for tracking events and classifying assets within a social network in accordance with an embodiment of the invention. The system 100 includes one or more user devices 110, one or more external systems 120, the social networking system 130, and a network 150. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 150. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 150. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS and ANDROID. The user device 110 is configured to communicate with the external system 120 and the social networking system 130 via the network 150, which may comprise any combination of local area and/or wide area networks, using wired and/or wireless communication systems.

In one embodiment, the network 150 uses standard communications technologies and protocols. Thus, the network 150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable modification of the data communicated from the social networking system 130 to the user device 110.

The external system 120 includes one or more web servers that include one or more web pages 122a, 122b, which are communicated to the user device 110 using the network 150. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 130 may be administered, managed, or controlled by an operator. The operator of the social networking system 130 may be a human being, an automated application, or a series of applications for managing content, regulating policies, and collecting usage metrics within the social networking system 130 or combination thereof. Any type of operator may be used.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 150.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, an event tracking module 146, and an asset classification module 148. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user account store 136 maintains information about user accounts, including biographic, demographic, and other types of descriptive information, such as work experience, educational history, hobbies or preferences, location, and the like that has been declared by users or inferred by the social networking system 130. This information is stored in the user account store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user account store 136 and the connection store 138 store instances of the corresponding type of objects maintained by the social networking system 130. Each object type has information fields that are suitable for storing information appropriate to the type of object. For example, the user account store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user account store 136 and the connection store 138 may be implemented as a federated database.

Data stored in the connection store 138, the user account store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user account store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user account store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 150. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 150, and the API request server 134 receives the API request. The API request server 134 processes the request by calling an API associated with the API request to generate an appropriate response, which the API request server 134 communicates to the external system 120 via the network 150. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The social networking system 130 may include a event tracking module 146 and an asset classification module 148. The event tracking module 146 may detect the occurrence of events involving assets within the social networking system 130 based on time windows and counters, as described further below. The asset classification module 148 may classify the assets based on decision trees, machine learning modules, or other techniques. The techniques may be performed based on the events tracked by the event tracking module 146.

Tracking Events Using Time-Windowed Counters

Various events may occur within the social networking system 130. An event may refer to a user interaction with a content item, a user interaction with another user, creation of a message, or any action involving an asset within the social networking system 130. An asset may refer to any data item created by, communicated within, or otherwise related to the social networking system 130 that may be of interest to the operator of the social networking system 130. For example, an asset may be a user, a content item, an IP address, a URL, a message, or any other item handled by the social networking system 130. The operator of the social networking system 130 may wish to track all of the various events that have occurred involving a particular asset. For example, the operator of the social networking system 130 may wish to determine how many unique users have interacted with a particular asset. By gathering specific information on assets and events, the operator of the social networking system 130 may be able to make informed design decisions about the functionality, user interface, policies, and other dimensions of the social networking system 130.

The operator of the social networking system 130 may wish to track events within specific time periods. Determining the number of events that occur within particular time periods may allow the operator to identify trends, spikes, and other variations in activity involving assets. In addition, creating further delineations within the time period may allow the operator to determine how activity trends involving a user or an asset changed over the course of the time period. For example, the social networking system 130 may determine that a user logged into his account on the social networking system 130 30 times over the previous week. This information may be useful, but it may be more beneficial to learn that the user logged into his account three times on Monday, four times on Tuesday, four times on Wednesday, 15 times on Thursday, once on Friday, two times on Saturday, and once on Sunday. The social networking system 130 may identify a spike in the number of times the user logged in on Thursday, which may allow the social networking system 130 to, for example, optimize aspects of the user's experience or take other appropriate action.

According to an embodiment, the data gathered using event tracking techniques may be used for asset classification. If the social networking system 130 has numerous users, the social networking system 130 may classify assets based on the events involving the assets. By classifying assets, the social networking system 130 may make decisions and take appropriate action based on such classifications. For example, the social networking system 130 may determine which content items to include in a content feed of a user based on the classification of the user. As another example, the social networking system 130 may determine which content items to block or filter in a content feed or other functionality of the social networking system 130.

One application in which asset classification may be useful is spam detection. As user adoption of social networks has grown, social networks have become an increasingly popular platform for entities to deliver spam, e.g., unsolicited messages or content. Spam content items may be disguised as legitimate content items in order to mislead users into interacting with them. In addition, a spam content item may include hidden functionality that allows the content item to replicate itself when the user has interacted with it. For example, a URL leading to a spam site may be disguised as a link to a site with a legitimate purpose. A user may click on the link, which may activate functionality that posts the link to the profiles of all of the user's friends in the social networking system 130. Spam may diminish the quality of the user experience of the social networking system 130. A user may hesitate to interact with a content item if he is unsure that it genuinely serves a legitimate purpose. If spammers are able to spread content items throughout the social networking system 130, the utility of content sharing functionality of the social networking system 130, such as the news feed, may be negatively affected. To address this concern, the social networking system 130 may classify certain assets as spam based on their event history. The social networking system 130 may then take action against assets based on their classification. For example, the accounts of users that are classified as spammers may be blocked, terminated, or flagged for further review. As another example, when users attempt to interact with content items that are classified as spam, the social networking system 130 may prompt them with warnings or requests for verification.

Embodiments of the invention provide a technique for tracking events and classifying assets within the social networking system 130 based on counters and time windows. A counter may refer to a variable used to keep track of the occurrence of a type of event (or event) within the social networking system 130. The counter may be incremented each time a type of event (or event) occurs. Each type of event may have one or more unique counters associated with it. The social networking system 130 may create counters for the types of events that are to be tracked over various windows of time. A time window may refer to a period of time. The time window may be defined with reference to any length of time, e.g., the previous week, or with respect to any specified beginning point and end point, e.g., between 12:00 PM on July 24 and 5:00 AM on August 1. The time window may refer to any time period in the past, e.g., the previous three days, or any time period in the future, e.g., the next three days. The techniques provided by the embodiments of the present invention may be performed in real-time or asynchronously (e.g., in a periodic batch).

According to an embodiment of the invention, a time window may be further divided into time intervals. A time interval, or bucket, may refer to a discrete time period smaller than the time period encompassed by the time window. A sum of time intervals may be equivalent to the time period encompassed by the time window. For example, a time window of one hour may be divided into ten time intervals of six minutes each. In an embodiment, each time interval may have a counter associated with it, such that the counter tracks the number of times a type of event has occurred within the time interval. With respect to tracking events and asset classification within the social networking system 130, the number of time intervals within a time window may be adjusted based on the degree of precision desired and the amount of storage available. A large number of time intervals may result in the creation of a relatively greater number of counters and may facilitate a higher degree of precision, but would require more storage. A smaller number of time intervals may result in the creation of a relatively fewer number of counters and may save storage, but result in a lower degree of precision.

According to an embodiment of the invention, a time series for a particular event or type of event involving a particular asset may be derived using counters and time windows. The time series of an event type may represent the number of times an event type is occurring at a given moment. The time series of the event type may be expressed as a function and a curve on a graph. The number of times an event type has occurred in a specific period of time may be referred to as a signal. The value of a signal may be determined by solving one or more functions. In an embodiment, the function for determining the value of a signal may comprise an integral for computing the area under the curve representing the signal.

According to an embodiment of the invention, an asset may be classified based on the values of signals. The social networking system 130 may use procedures for classifying assets. The procedures for classifying assets may use decision trees, machine learning models, and other techniques for processing and interpreting the signal values. The procedures may be based on the values of multiple signals related to the same asset. In an embodiment, the procedures may be based on a signal value that reflects the total number of events of a first type involving a particular asset as well as a signal value that reflects the total number of events of a second type involving the particular asset. The event types may be independent of or related to one another. In an embodiment, the procedures may be based on a signal value that reflects the total number of events involving a particular asset as well as a signal value that reflects the number of events involving the particular asset and unique users.

The social networking system 130 may track events involving uniqueness, such as unique users in addition to tracking total events. Information about events involving uniqueness may offer additional perspective on the activity involving an asset. The additional perspective, in turn, may allow the social networking system 130 to better classify an asset or otherwise take appropriate action.

For example, the social networking system 130 may use counters to track how many times a URL http://www.xyz.com has been shared within the social networking system 130. The social networking system 130 may initialize a first counter that is incremented each time the URL http://www.xyz.com is shared within the social networking system 130. The social networking system 130 may initialize a second counter that is incremented each time the URL http://www.xyz.com is shared within the social networking system 130 by a unique user. In one embodiment, the second counter may be incremented only when the URL http://www.xyz.com is shared by a user who has not previously shared it. The social networking system 130 may derive a function and an accompanying graph illustrating a time series of the number of times the URL http://www.xyz.com has been shared within the social networking system 130.

Figure 2A:
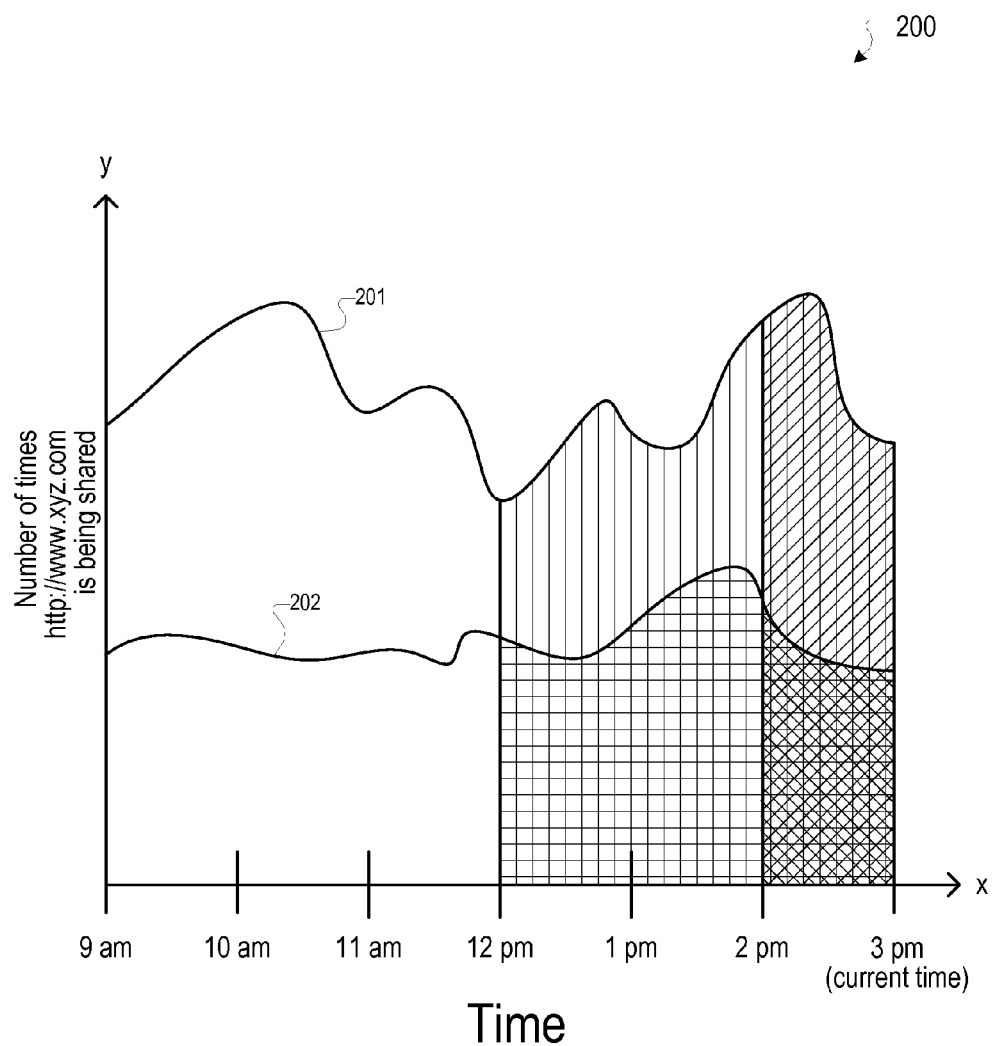
FIGS. 2A-B are illustrations of an example graph including a time series of the number of times a URL has been shared within the social networking system, in accordance with an embodiment of the invention.
Figure 2B:
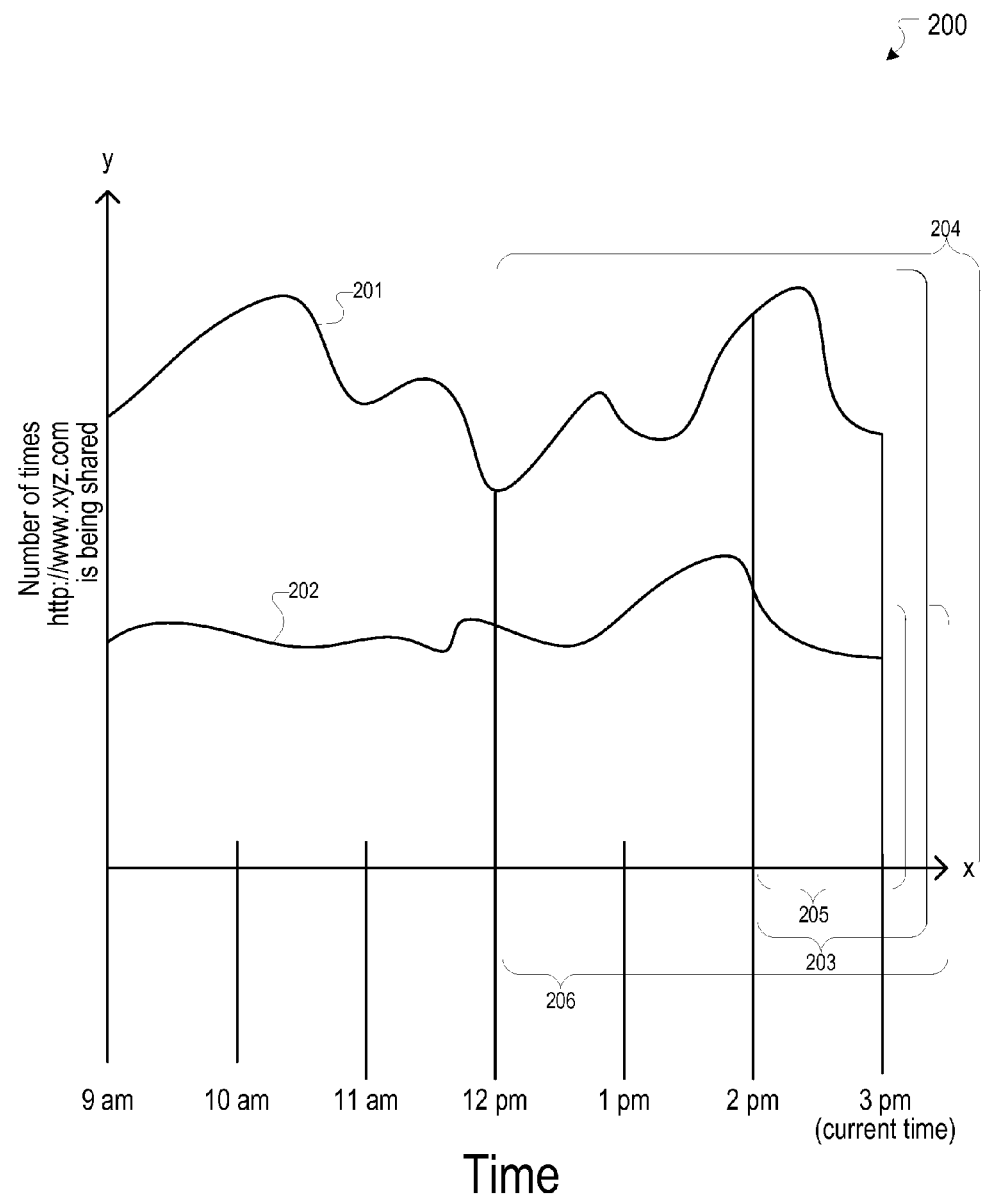

FIGS. 2A-B are illustrations of an example graph 200 including a time series of the number of times the URL http://www.xyz.com has been shared within the social networking system 130 in accordance with an embodiment of the invention. In the graph 200, the x-axis represents time and the y-axis represents the number of times the URL http://www.xyz.com is being shared within the social networking system 130 at a given time. Curve 201 represents the number of times the URL http://www.xyz.com has been shared within the social networking system 130 over time. Curve 202 represents the number of times the URL http://www.xyz.com has been shared within the social networking system 130 by unique users over time. The graph 200 encompasses the time period from 9:00 AM until 3:00 PM, which may represent the current time, a previous time, or a prospective time.

The social networking system 130 may determine signal values such as the total number of times $f_1$ the URL http://www.xyz.com has been shared within the social networking system 130 in the previous hour and the total number of times $f_2$ the URL http://www.xyz.com has been shared within the social networking system 130 in the previous three hours, which may be expressed as $f_1=\text{SigVal}_t(n(y), 1\text{ hr})$ and
$f_2=\text{SigVal}_t(n(y), 3\text{ hr})$, respectively, where n(y) represents the function of the curve 201. In an embodiment, $\text{SigVal}_t$ may comprise an integral over time. The total number of times $f_1$ the URL http://www.xyz.com has been shared within the social networking system 130 in the previous hour and the total number of times $f_2$ the URL http://www.xyz.com has been shared within the social networking system 130 in the previous three hours are represented by shaded regions 203 and 204, respectively, on the graph 200.

The social networking system 130 also may determine additional signal values, such as the number of times $g_1$ the URL http://www.xyz.com has been shared within the social networking system 130 by unique users in the previous one hour and the number of times $g_2$ the URL http://www.xyz.com has been shared within the social networking system 130 by unique users in the previous three hours, which may be expressed as:

$g_1=\text{SigVal}_u(p(y), 1\text{ hr})$ and
$g_2=\text{SigVal}_u(p(y), 3\text{ hr})$, respectively, where p(y) represents the function of the curve 202. In an embodiment, $\text{SigVal}_u$ may comprise an integral over time. The number of times the URL http://www.xyz.com has been shared within the social networking system 130 by unique users in the previous hour $g_1$ and the number of times the URL http://www.xyz.com has been shared within the social networking system 130 by unique users in the previous three hours $g_2$ are represented by shaded regions 205 and 206, respectively, on the graph 200.

The signal values $f_1$, $f_2$, $g_1$, and $g_2$ may be used in a procedure for classifying the URL http://www.xyz.com. The procedure may be based on decision trees, machine learning models, and other techniques for processing and interpreting the signal values. In an embodiment, the procedure may generate a score that correlates to a particular classification. For example, the classification may relate to whether or not the URL http://www.xyz.com is spam, the popularity of the URL http://www.xyz.com, the type of site that the URL http://www.xyz.com directs to, or any other information about the URL http://www.xyz.com or assets associated with the URL http://www.xyz.com. If the URL http://www.xyz.com is classified as spam, the social networking system 130 may, for example, display a warning to users who click on it. If the URL http://www.xyz.com is classified as spam, the social networking system 130 may, for example, require users who attempt to share it to complete a verification test to confirm that the user is not a spammer or that the user has not been misled by a spammer to share the link. In an embodiment, the social networking system 130 may consider portions of URLs as distinct assets and track events involving each portion. For example, the social networking system 130 may track sharing of all URLs that include the domain xyz.com.

The social networking system 130 may track sharing of the URL http://www.xyz.com by unique users because information about sharing by unique users may be more informative than information about sharing by all users. For example, if the social networking system 130 determines only that the URL http://www.xyz.com has been shared by 100 users in the past hour, then the social networking system 130 may conclude that the URL is popular. However, if the social networking system 130 determines that the URL http://www.xyz.com has been shared 100 times by a single user in the past hour, then the social networking system 130 may conclude that the URL is spam. Other applications that track uniqueness in events within the social networking system 130 may be employed for classification purposes.

According to an embodiment of the invention, the social networking system 130 may collect in real time (or near real time) multiple, independent time series of various types of events involving an asset. For example, the URL http://www.xyz.com may be clicked, hidden (e.g., when a user selects an option to remove the URL from his news feed), and shared (e.g., when a user provides the URL to others). The social networking system 130 may track, as independent time series, the total number of times that the URL http://www.xyz.com was clicked, the total number of times the URL http://www.xyz.com was hidden, and the total number of times that the URL http://www.xyz.com was shared.

For each time series, the social networking system 130 in real time may perform queries over different time intervals. For example, the social networking system 130 may track the number of times that the URL http://www.xyz.com was clicked over the previous five minutes, the previous hour, and the previous day; the number of times that the URL http://www.xyz.com was hidden over the previous five minutes, the previous hour, and the previous day; and, the number of times that the URL http://www.xyz.com was shared over the previous five minutes, the previous hour, and the previous day. Such tracking may result in nine signal values based on multiple, independent time series. The URL http://www.xyz.com may be classified based on any combination of the nine signal values. In general, two or more signal values may be used within rules (e.g., decision trees) or otherwise to further policies of the social networking system 130, such as fighting spam.

Figure 3:
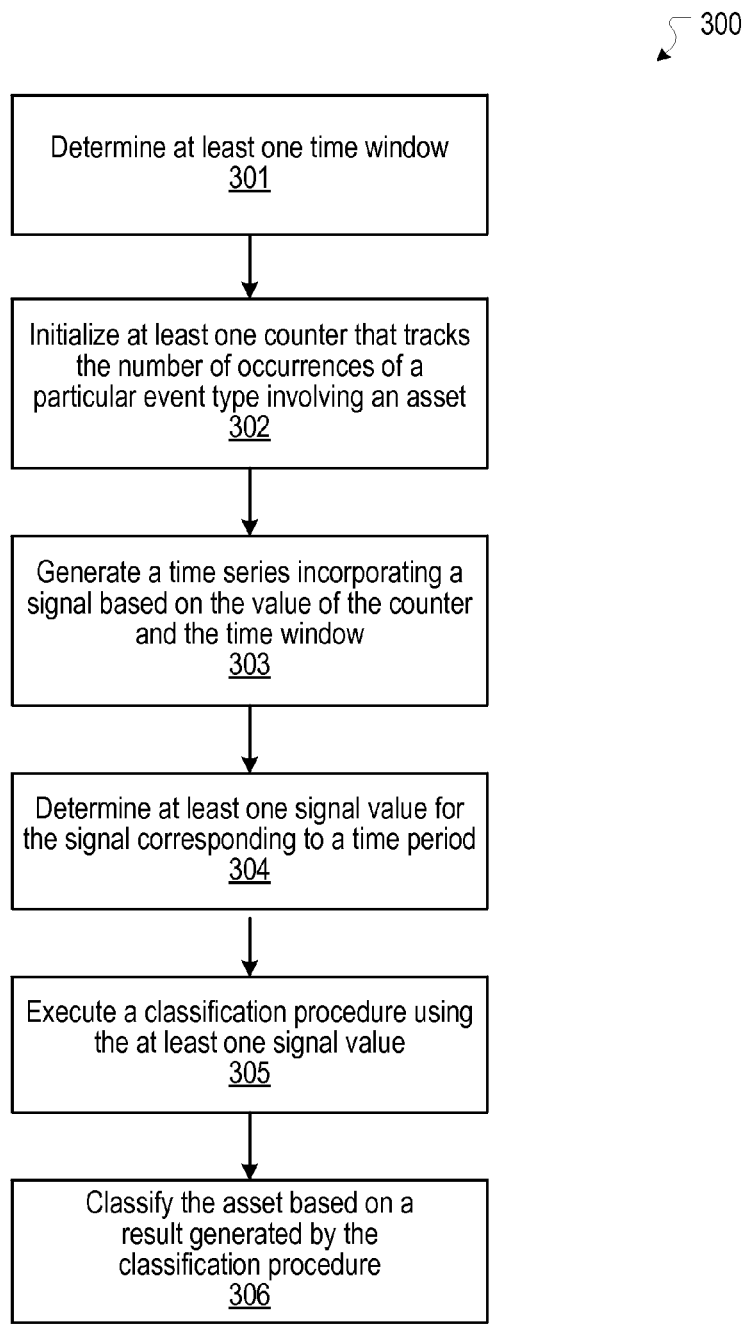
FIG. 3 illustrates a process for classifying an asset in accordance with an embodiment of the invention.

FIG. 3 illustrates a process 300 for classifying an asset in accordance with an embodiment of the invention. At block 301, the social networking system 130 determines at least one time window. At block 302, the social networking system 130 initializes at least one counter that tracks the number of occurrences of a particular event type involving the asset. In an embodiment, the counter may be associated with the time window. The counter may be incremented every time an event of the event type occurs within the time window. At block 303, the social networking system 130 generates a time series based on a signal and the value of the counter and the time window. At block 304, the social networking system 130 determines at least one signal value for the signal associated with a time period. In an embodiment, the signal value may be determined by calculating the area corresponding to the time period under the portion of a curve representing the signal in the time series. The area under the curve may be determined based on an integration. At block 305, the social networking system 130 executes a classification procedure using the signal value. The classification procedure may incorporate decision trees, machine learning models, and other techniques for processing and interpreting signal values. At block 306, the social networking system 130 classifies the asset based on a result generated by the classification procedure. The asset may be classified based on whether or not it relates to spam, popularity, ranking, or any other category or criterion relevant to the operation and function of the social networking system 130. Popularity may refer to the frequency with which events involving an asset occur. For example, the popularity of a user may be determined based on the number of messages received by the user. Ranking may refer to the position of an asset relative to other assets based on a criterion. For example, various URLs may be ranked based on the frequency with which they are shared. In an embodiment, the process 300 may be performed in whole or in part by the event tracking module 146, the asset classification module 148, or any other module of the social networking system 130.

According to an embodiment of the invention, the time windows and time intervals may be implemented as data structures comprising elements. An element is a discrete component of a data structure with which a value may be associated. Each data structure may represent a time window, and an element of a data structure may represent a time interval within the time window. Each counter may be implemented as a variable associated with an element. Thus, each variable may track the occurrence of events within the time interval represented by the element with which the variable is associated. The data structures, elements, and variables may be stored within a memory caching system of the social networking system 130.

According to an embodiment of the invention, the counters and time windows may be implemented as circular buffers. A circular buffer is a data structure with discrete elements to which new data may be added by overwriting elements containing older data. In a circular buffer, the elements may be overwritten according to the order in which data was added to them; e.g., when new data needs to be added to the buffer, it is stored in the element containing the oldest data, thereby overwriting that oldest data. In an embodiment, a circular buffer may represent a time window, and the elements within the circular buffer may represent time intervals within the time window. The time intervals may be of equal or non-equal length, wherein the sum of the time intervals is equal to the period of time encompassed by the time window. For example, a circular buffer representing a time window of one minute may comprise six elements representing time intervals of ten seconds each. As time elapses and events occur, the social networking system 130 may increment a counter stored within the element representing the current time interval. When the current time interval ends, the social networking system 130 may reset a counter within the element representing the least recent time interval and re-assign the element to the new current time interval. In an embodiment, the social networking system 130 may track events over multiple time windows of any varying durations and maintain separate circular buffers for each time window. In an embodiment, data collected using circular buffers may be analyzed in real-time. In an embodiment, data collected using circular buffers may be analyzed using processes and techniques that are performed asynchronously.

FIGS. 4A and 4B illustrate an example circular buffer 400 representing a time window and a series of counters in accordance with an embodiment of the invention. The time window and counters may track the occurrences of a particular type of event involving a particular asset. The buffer 400 comprises eight elements 401, 402, 403, 404, 405, 406, 407, and 408. The buffer 400 represents a continuous one hour and twenty minute time window. Each of the elements represents a ten-minute time interval within the time window. In FIG. 4A, the current time is 12:45 and a counter has been incremented during the current time interval 23 times. The element 401 represents the time interval beginning at 11:30. During the time interval beginning at 11:30, a counter was incremented five times. In FIG. 4B, ten minutes have elapsed, and the current time is 12:55. Because the element 401 represented the least recent time interval in FIG. 4A, i.e, the time interval beginning at 11:30, the data in the element 401 has been overwritten in FIG. 4B with a new counter associated with the current time interval. Thus, the element 401 in FIG. 4B has been re-assigned to the current time interval. The new counter associated with the current time interval in FIG. 4B has been incremented twice, indicating that two events have occurred between 12:50 and 12:55.

According to an embodiment of the invention, the counters and time windows may be implemented as linear buffers. In an embodiment, a linear buffer may be used to implement a time window with exponentially decaying time intervals. Exponentially decaying time intervals may refer to time intervals that are not of uniform duration and may become larger as time elapses. In one embodiment, time intervals may vary in duration according to any desired relationship, such as mathematically linear or exponential functions. For example, the duration of each time interval may be twice that of the time interval it precedes. In this regard, the most recent time interval may be one minute long, the next time interval may be two minutes long, the next time interval may be four minutes long, the next time interval may be eight minutes long, etc. Thus, the duration of the time intervals may change as time elapses.

In a time window comprising exponentially decaying time intervals, if each time interval has an associated counter, each counter may need to be continuously or periodically updated to accurately reflect the time interval within which each event occurred as time elapses. In an embodiment, the least recent time interval may be a fixed or expanding time interval whose counter is incremented or decremented as time elapses to account for the occurrence of events that were previously associated with later time intervals. The number of time intervals to be created and their duration may be pre-determined. Exponentially decaying time intervals may allow precise tracking of recent events while conserving storage capacity by passing a record of the occurrence of events to progressively larger time intervals as time progresses and the events become less recent. In an embodiment, the linear buffer may have a storage limit associated with the maximum length of time for the time window. In an embodiment, the maximum length of time may be one year. In other embodiments, the maximum length of time may be any duration, such as a day, a week, a month, etc. In an embodiment, data collected using linear buffers and exponentially decaying time intervals may be analyzed in real-time. In an embodiment, data collected using linear buffers and exponentially decaying time intervals may be analyzed using processes and techniques that are performed asynchronously.

FIGS. 5A and 5B illustrate an example linear buffer 500 representing a time window comprising exponentially-decaying time intervals and a series of associated counters in accordance with an embodiment of the invention. The time window and counters may track the occurrence of a particular type of event involving a particular asset. In FIG. 5A, element 501 represents the most recent 1-minute time interval beginning at 12:44 and ending at 12:45, element 502 represents a previous 2-minute time interval beginning at 12:42 and ending at 12:44, element 503 represents a previous 4-minute time interval beginning at 12:38 and ending at 12:42, and element 504 represents a previous 8-minute time interval beginning at 12:30 and ending at 12:38. Each element stores a counter associated with the time interval representing the element. At 12:30, the time window was created and the linear buffer was initialized. In FIG. 5A, approximately 15 minutes have elapsed between the creation of the time window and the current time, 12:44:23. A counter associated with the element 501 has been incremented 7 times, indicating that 7 events have occurred in the time interval represented by the element 501. A counter associated with the element 502 has been incremented 34 times, indicating that 34 events have occurred in the time interval represented by the element 502. A counter associated with the element 503 has been incremented 50 times, indicating that 50 events have occurred in the time interval representing the element 503. A counter associated with the element 504 has been incremented 72 times, indicating that 72 events have occurred in the time interval representing the element 504.

In FIG. 5B, approximately 2 minutes have elapsed and the current time is 12:46:30. Each of the time windows have been shifted forward by 2 minutes, such that the element 501 represents the most recent 1-minute time interval beginning at 12:46 and ending at 12:47, the element 502 represents a previous 2-minute time interval beginning at 12:44 and ending at 12:46, the element 503 represents a previous 4-minute time interval beginning at 12:40 and ending at 12:44, and the element 504 represents a previous 10-minute time interval beginning at 12:30 and ending at 12:40. Thus, in the illustrated example, the element 504 represents an expanding time interval. As indicated by arrow 505, the seven events that occurred within the time interval between 12:44 and 12:45 are passed from the counter associated with the element 501 to the counter associated with the element 502. As indicated by arrow 506, the 34 events that occurred within the time interval between 12:42 and 12:44 are passed from the counter associated with the element 502 to the counter associated with the element 503. The earlier half of the time interval between 12:38 and 12:42 falls within the time interval represented by element 503 and the latter half of the time interval between 12:38 and 12:42 falls within the time interval represented by the element 504. Accordingly, as indicated by arrows 507 and 508, half of the 50 events that occurred between 12:38 and 12:42 are kept within the counter associated with the element 503 and half are passed to the counter associated with the element 504. As indicated by arrow 509, the 72 events that occurred within the time interval between 12:30 and 12:38 are kept in the element 504. To reflect one event that has occurred in the approximately two minutes that have elapsed between 12:44:23 and 12:46:30, the counter associated with the element 501 representing the time window between 12:46 and 12:47 is reset and incremented once. Thus, the counters associated with the elements are updated to have values of 1, 7, 59, and 97, respectively.

According to an embodiment of the invention, a linear buffer may be used to implement a time window comprising non-decreasing time intervals. A non-decreasing time interval may be a time interval of fixed size. Each element in the linear buffer may represent a non-decreasing time interval with an associated counter. When the interval commences, its associated counter may be incremented every time an event of a particular type involving a particular asset occurs. When the interval ends, its associated counter may no longer need to be updated or overwritten, as may be the case with a circular buffer. Time windows with non-decreasing intervals may have larger storage requirements, but may also allow for greater precision in tracking less recent events. This may be particularly useful for analyzing comparable time intervals for a particular type of event.

For example, there may be a sudden rise in the number of times users of the social networking system 130 share a URL of a sports site during a specific time interval (e.g., from 12:30 PM to 1:30 PM) on the most recent Sunday. Absent further information, the social networking system 130 may be unable to attribute the rise to any cause. If user sharing of the URL is tracked using time windows with non-decreasing time intervals, the social networking system 130 may compare the rise in sharing of the URL during the specific time interval on the most recent Sunday with the number of times the URL was shared during an analogous time interval on previous Sundays (e.g., 12:00 PM on Sunday 9/2 compared with 12:00 PM on Sunday 8/26). In an embodiment, the social networking system 130 may analyze trends in the occurrence of a type of event by comparing a recent time interval to a previous time interval. The social networking system 130 may observe similar rises in user sharing of the URL on previous Sundays and correlate the rise to weekly football games that occur mainly on Sundays during the early afternoon. In an embodiment, data collected using linear buffers and non-decreasing time intervals may be analyzed in real-time. In an embodiment, data collected using linear buffers and non-decreasing time intervals may be analyzed using processes and techniques that are performed asynchronously.

User sharing of the URL instead may be tracked using circular buffers, exponentially-decaying time buffers, or other types of time intervals. In the case of circular buffers, the number of times the URL was shared during a time interval of a previous Sunday may be overwritten if the distance in time between the time interval of the previous Sunday and the time interval of the most recent Sunday is larger than the time window of the circular buffer. As a result, time-windowed comparisons of URL sharing occurrences would be difficult or impossible in some instances. In the case of exponentially-decaying time intervals, the number of times the URL was shared during the time interval of the previous Sunday may have been passed to a counter associated with a much longer time interval. A resulting loss of granularity in the ability to correlate recent events with events that are passed to increasingly longer time intervals may preclude meaningful time-windowed comparison of URL sharing occurrences. The selective use of certain buffers or time intervals accordingly may pose advantages in allowing time-windowed comparisons.

According to an embodiment of the invention, the social networking system 130 may use time windows and counters to evaluate or modify policies. The social networking system 130 may implement policies that regulate user interactions with certain types of content. A policy may be implemented using an asset. For example, if a certain URL is suspected to be spam, the social networking system 130 may require every fifth user who shares the URL to complete a verification test before the share is submitted. The social networking system 130 may track how many users pass or fail the verification test over time. If a majority of the users pass the verification test, then the suspicion that the URL is spam may lessen and the social networking system 130 may decrease the number of users who are required to complete the verification test. If a majority of the users fail the verification test, then the suspicion that the URL is spam may heighten and the social networking system 130 may increase the number of users who are required to complete the verification test. The social networking system 130 may compare the pass rate of the verification test in a recent time window with the pass rate of the verification test in a previous time window. By comparing pass rates, the social networking system 130 may, for example, detect if spammers have developed techniques to circumvent the verification test over time. In an embodiment, a verification test may be an asset. A user passing the test and a user failing the test may be considered distinct types of events, and the occurrences of each type of event may be tracked by the social networking system 130 using any of the techniques described herein.

Hardware Implementation

Figure 6:
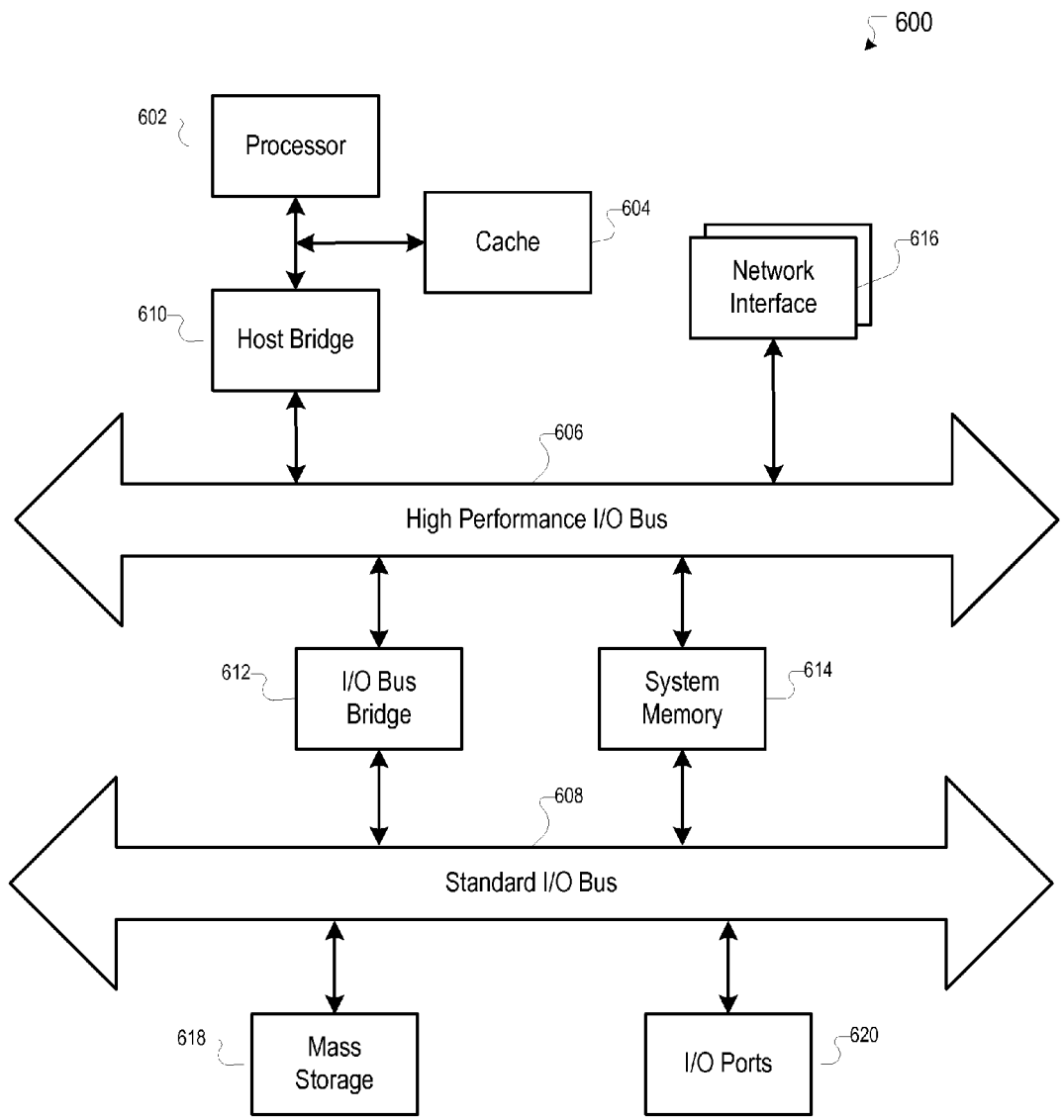
FIG. 6 illustrates an example of a computer system that may be used to implement one or more of the embodiments described herein in accordance with an embodiment of the invention.

The foregoing processes and features can be implemented by a wide variety of machine and computer system architectures and in a wide variety of network and computing environments. FIG. 6 illustrates an example of a computer system 600 that may be used to implement one or more of the embodiments described herein in accordance with an embodiment of the invention. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be the social networking system 130, the user device 110, and the external system 120, or a component thereof. In an embodiment of the invention, the computer system 600 may be one server among many that constitutes all or part of the social networking system 130.

The computer system 600 includes a processor 602, a cache 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 may further include video memory and a display device coupled to the video memory (not shown). Mass storage 618 and I/O ports 620 couple to the standard I/O bus 608. The computer system 600 may optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614 and then accessed and executed by the processor 602.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
   generating, by a computer system, at least one time series of event occurrences of an event type within at least one time window having one or more time intervals, wherein the at least one time series is associated with at least one asset;
   determining, by the computer system, a first signal value and a second signal value based on the at least one time series of the event occurrences; and
   classifying, by the computer system, the at least one asset based on comparison of the first signal value and the second signal value;
   resetting a counter associated with a least recent time interval of the time intervals; and
   incrementing the counter upon an occurrence of the event type associated with the at least one asset during a most recent time interval.

2. The computer implemented method of claim 1, wherein at least one of the first signal value and the second signal value is based on uniqueness.

3. The computer implemented method of claim 1, wherein generating the at least one time series includes associating counters respectively with the time intervals, wherein each of the counters are for tracking the number of event occurrences of the event type.

4. The computer implemented method of claim 3, further comprising incrementing each of the counters upon an occurrence of the event type associated with the at least one asset during an associated time interval.

5. The computer implemented method of claim 1, wherein the at least one time window is implemented as a circular buffer.

6. The computer implemented method of claim 5, wherein the circular buffer comprises elements representing the time intervals.

7. The computer implemented method of claim 1, wherein the at least one time window is implemented as a linear buffer.

8. The computer implemented method of claim 7, wherein the linear buffer is associated with at least one of exponentially-decaying time intervals and non-decreasing time intervals.

9. The computer implemented method of claim 7, wherein the linear buffer comprises elements representing the time intervals.

10. The computer implemented method of claim 1, further comprising:
    providing a value from a first counter associated with a first time interval to a second counter associated with a second time interval;
    resetting the first counter; and
    incrementing the first counter upon an occurrence of the event type associated with the at least one asset.

11. The computer implemented method of claim 1, wherein the classifying comprises:
    generating a score based on a procedure incorporating the first signal value and the second signal value; and
    assigning the at least one asset to a classification based on the score.

12. The computer implemented method of claim 11, wherein the procedure comprises at least one of a decision tree and a machine learning model.

13. The computer implemented method of claim 11, wherein the classification comprises at least one of a spam category, a popularity category, and a ranking.

14. The computer implemented method of claim 1, wherein the determining comprises calculating an integral of at least one function.

15. The computer implemented method of claim 1, further comprising modifying a policy based on classification of the at least one asset.

16. The computer implemented method of claim 1, wherein at least one of the generating, the determining, and the classifying is performed in real time.

17. A system comprising:
    at least one processor; and
    a memory storing instructions configured to instruct the at least one processor to perform:
        generating at least one time series of event occurrences of an event type within at least one time window having one or more time intervals, wherein the at least one time series is associated with at least one asset;
        determining a first signal value and a second signal value based on the one or more time intervals in the at least one time series;
        classifying the at least one asset based on comparison of the first signal value and the second signal value; and
        wherein the at least one time series is associated with at least one of exponentially-decaying time intervals and non-decreasing time intervals.

18. A non-transitory computer storage medium storing computer-executable instructions that, when executed, cause a computer system to perform a computer-implemented method comprising:

generating at least one time series of event occurrences of an event type within at least one time window having one or more time intervals, wherein the at least one time series is associated with at least one asset;

determining a first signal value and a second signal value based on the at least one time series;

classifying the at least one asset based on comparison of the first signal value and the second signal value; and providing a value from a first counter associated with a first time interval to a second counter associated with a second time interval;

resetting the first counter; and incrementing the first counter upon an occurrence of the event type associated with the at least one asset.

* * * * *